E. H. N. CLARKSON,
Assignor to F. B. SLOAN & F. S. CLARKSON.
Sash-Cord Guide.
No. 9,222. Reissued June 1, 1880.
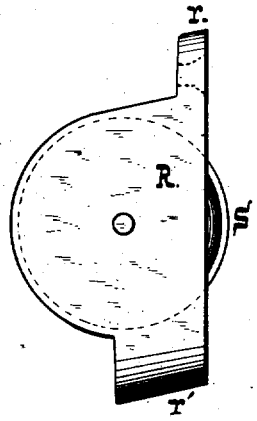
Witnesses,
W. A. Bertram
D. L. H. Barclay.
Inventor,
E. H. N. CLARKSON
by
A. D. Williams
Attorney.
N. PETERS, PHOTO-LITHOGRAPHER, WASHINGTON, D. C.

UNITED STATES PATENT OFFICE.

EDWARD H. N. CLARKSON, OF BALTIMORE, MARYLAND, ASSIGNOR TO FRANK B. SLOAN AND FRANK S. CLARKSON, OF SAME PLACE.

SASH-CORD GUIDE.

SPECIFICATION forming part of Reissued Letters Patent No. 9,222, dated June 1, 1880.

Original No. 216,722, dated June 24, 1879. Application for reissue filed April 20, 1880.

DIVISION B.

*To all whom it may concern:*

Be it known that I, EDWARD H. N. CLARKSON, of Baltimore city, State of Maryland, have invented certain new and useful Improvements in Sash-Cord Guides; and I hereby declare the same to be fully, clearly, and exactly described as follows, reference being had to the accompanying drawing, which is a side elevation of the device.

This invention relates to that class of devices consisting of a casing and sheave, over which latter the cords are led from which the sash and its weight are suspended.

The device about to be described is identical in principle with that invented by William H. H. Kesler and me, forming the subject of reissued Letters Patent No. 8,586, dated February 18, 1879. Both are adapted for insertion in a machine-made mortise formed by a laterally-cutting bit, and a separate fastening-screw or other independent securing device is dispensed with at one end of the sash-cord guide by reason of its end being made to engage with the mortise in the window-frame.

The patented device, however, was not adapted for insertion in a mortise made by means of a bit having right-line motion, nor by means of the simple and efficient machine forming the subject of the other division of this reissue; and the securing-screw in the upper end of the device was either inserted at an angle with the face of the casing, or, if inserted at right angles thereto, was necessarily of an unseemly size.

I secure all the advantages of the patented device, while obviating its disadvantages, by constructing a sash-cord guide in substantially the form shown in the accompanying drawing.

The lower end of the casing is made to project downward within the window-frame, thereby dispensing with a securing-screw, and its upper end is provided with a flange perforated for the securing-screw, both ends being rounded.

In the accompanying drawing, R is the casing, having rounded ends $r$ $r'$ and sheave $s$, the lower end, $r'$, being beveled, as shown, so as to engage with the end of the window-frame mortise. The machine for forming this mortise is provided with a revolving and reciprocating bit having lateral cutting-edges, and carries a frame for supporting the window-frame, and for presenting it to the bit at an angle equal to that of the bevel of the ends of the sash-cord guide.

The bit-carrier and window-frame support are provided, respectively, with a guide and a form, which latter has an outline of such shape as to cause the bit to cut a peculiarly-shaped mortise, in which the sash-cord guide exactly fits. The bit is projected forward into the window-frame to a depth equal to the thickness of the lower end of the sash-cord guide, at which point its advance is arrested by a stop which engages with the form. The window-frame is then made to travel laterally with reference to the bit to a distance equal to the length of the straight rear face at the lower end of the sash-cord guide, when the bit is again projected forward, perforating the window-frame. The latter is then again moved laterally to a distance equal to the length of the body of the sash-cord guide, when the bit is withdrawn until its point is sunk in the face of the frame to the thickness only of the flange $r$. The frame is finally made to travel laterally to a distance measured by the length of the flange, when the bit is finally withdrawn, the mortise being complete.

It is evident that by the described method of cutting the mortise a perfectly accurate fit of the pulley therein is insured.

In Letters Patent No. 216,722, dated June 24, 1879, of which this is a reissue, the sash-cord guide hereinbefore described is incorrectly stated to be the same as that forming the subject of reissued Letters Patent No. 8,586, dated February 18, 1879. The two differ in the particulars pointed out in the annexed claim, which features admit of the formation of the mortise for the sash-cord guide by means of a laterally-cutting and reciprocating bit.

What I claim is—

The sash-cord guide herein described, consisting of the sheave and casing, the latter having rounded ends, of which the upper one is flanged and perforated and the lower projects downward within the window-frame, whereby the device is adapted for insertion in a mortise formed by means of a laterally-cutting bit, which enters the window-frame to the depth of the flanged end and base of the device and completely perforates the window-frame in the intermediate space, substantially as set forth.

EDW. H. N. CLARKSON.

Witnesses:
R. D. WILLIAMS,
JOHN C. GITTINGER.